(12) United States Patent
Zackrisson et al.

(10) Patent No.: US 6,773,211 B2
(45) Date of Patent: Aug. 10, 2004

(54) ORBITAL DRILLING CUTTING TOOL

(75) Inventors: Leif Zackrisson, Nynashamn (SE); Ingvar Eriksson, Stockholm (SE); Mats Jonsson, Huddinge (SE); Mathias Wolf, Båsta (SE); Göran Roswall, Hässelby (SE)

(73) Assignee: Novator AB, Spanga (SE)

( * ) Notice: Subject to any disclaimer, the term of this patent is extended or adjusted under 35 U.S.C. 154(b) by 0 days.

(21) Appl. No.: 10/147,712

(22) Filed: May 16, 2002

(65) Prior Publication Data

US 2002/0170178 A1 Nov. 21, 2002

Related U.S. Application Data

(60) Provisional application No. 60/292,048, filed on May 18, 2001.

(51) Int. Cl.[7] .................................................. B23C 1/00
(52) U.S. Cl. ..................... 409/132; 409/143; 409/200; 409/191; 409/74; 409/136; 407/53; 451/61; 451/211
(58) Field of Search ................................ 409/131–132, 409/143, 74, 191, 200, 136; 407/53–54, 48; 451/51, 61, 211, 357

(56) References Cited

U.S. PATENT DOCUMENTS

| | | | |
|---|---|---|---|
| 3,613,222 A | | 10/1971 | Richey |
| 3,621,754 A | * | 11/1971 | Ditson .......................... 409/74 |
| 4,190,386 A | | 2/1980 | Brabetz et al. |
| 4,338,050 A | | 7/1982 | Ozer et al. |
| 4,693,641 A | | 9/1987 | Tsujimura et al. |
| 4,757,645 A | | 7/1988 | Ozer et al. |
| 5,234,765 A | * | 8/1993 | Taylor et al. ............... 428/365 |
| 5,285,598 A | * | 2/1994 | Arita et al. .................... 451/51 |
| 5,634,747 A | | 6/1997 | Tukala et al. |
| 5,641,252 A | | 6/1997 | Eriksson et al. |
| 5,685,674 A | | 11/1997 | Taquist et al. |
| 5,733,078 A | * | 3/1998 | Matsushita et al. ........... 409/74 |
| 5,788,431 A | | 8/1998 | Basteck |
| 5,816,755 A | * | 10/1998 | Thelin ......................... 409/132 |
| 5,885,190 A | | 3/1999 | Reiter |
| 5,895,079 A | * | 4/1999 | Carstensen et al. ......... 285/333 |
| 5,934,847 A | * | 8/1999 | Thelin ......................... 409/132 |
| 5,947,653 A | | 9/1999 | Hamberg |
| 6,007,281 A | * | 12/1999 | Eriksson et al. ............. 409/132 |
| 6,200,197 B1 | * | 3/2001 | Eriksson et al. ............... 451/44 |
| 6,257,810 B1 | * | 7/2001 | Schmitt ........................ 409/74 |
| 2003/0047046 A1 | * | 3/2003 | Havskog ........................ 83/48 |

FOREIGN PATENT DOCUMENTS

| | | | |
|---|---|---|---|
| EP | 307823 A2 | * | 3/1989 |
| GB | 2 048 135 | | 12/1980 |
| JP | 55-112701 A | * | 8/1980 |
| SE | 173 899 | | 1/1961 |
| SE | 382 506 | | 6/1970 |
| SE | 400 916 | | 2/1976 |
| WO | WO 93/23192 | | 11/1993 |

* cited by examiner

Primary Examiner—Erica Cadugan
(74) Attorney, Agent, or Firm—Taylor & Aust, P.C.

(57) ABSTRACT

A method and cutting tool for producing a hole or a recess in a workpiece which includes flat or curved sheets of fiber-reinforced composite material, metal or combinations thereof. The cutting tool has a shaft with a longitudinal axis and an axial cutting surface and at least one cutting edge disposed on the axial cutting surface and extending radially from the longitudinal axis with a gap between the radial inner extent of the cutting edge and the longitudinal axis. The method of use includes rotating the cutting tool about its longitudinal axis and also translating the cutting tool during rotation.

10 Claims, 4 Drawing Sheets

ORBITAL DRILLING CUTTING TOOL

This is a non-provisional application that is a continuation of U.S. provisional patent application serial No. 60/292,048, entitled "ORBITAL DRILLING CUTTING TOOL", filed May 18, 2001.

BACKGROUND OF THE INVENTION

1. Field of the Invention

The present invention relates to a method and cutting tool for producing a hole or a recess in a workpiece which includes flat or curved sheets of fiber-reinforced composite material, metal or combinations thereof.

2. Description of the Related Art

Structures for aerospace and other applications are often made up of thin curved shells of different material such as aluminum, titanium, stainless steel and fiber-reinforced composite materials. In structural applications different components are often fastened by use of bolted joints. Bolt holes for aerospace structures are typically about 4–20 mm diameter with high quality requirements to secure the integrity of the structure.

Hole requirements are related to dimension and damage. Dimension requirements include, for example, cylindrical hole diameter, height of the cylindrical part of the hole, diameter and angle of countersinks, roundness, and alignment with the normal direction of the surface. Damage related requirements include, among other things, allowable burr height, surface finish and, with regard to fiber-reinforced composites, allowable delamination.

Particular problems occur when drilling holes in fiber-reinforced composites. Polymer composite materials have been generally known since the 1950's. These materials are composed of a protective and binding polymer, either a thermoplastic or a thermosetting plastic, usually referred to as the matrix, together with fibers (e.g. glass, carbon or amide fibers), which may be regarded as a reinforcing material. The fibers may be continuous and oriented in specific directions, or they may be relatively short and arranged at random in the matrix. Composites with continuous and oriented fibers give products with mechanical properties superior to those of conventional polymer and metallic materials, especially as far as their weight-related strength and stiffness are concerned. Composites with shorter fibers find an application where rather less demanding properties are called for. One factor obstructing the wider use of composite materials is the absence of effective methods of cutting machining. The physical and chemical properties of the composite materials purports that known machining methods cannot generally be applied with successful results.

Products consisting of composite material often contain holes for various purposes. These holes may be required, for instance, to permit the laying of service lines, assembly or inspection. Bolt holes are a particularly important category of hole. Structures for practical applications are often constructed from components joined together to produce a finished product. The purpose of the joint is to transfer the load from one structural element to another. One common form of joining is the bolted connection, in which the load is transferred by either shearing loads or tensile loads in the bolt. The strength of a bolted connection is influenced to a considerable degree by the quality and precision of the hole. Reference may be made to three particular problem areas when producing holes in polymer based fiber reinforced composite materials:

1. Low interlaminar strength. When machining laminated composite materials, there is a risk of the layers separating (delaminating) because of the low interlaminar strength. Extensive delamination damage can jeopardize the strength of the laminate.
2. Low resistance to heat and cold of certain thermoplastics. The heat generated during machining can cause the matrix to soften and block the tool, making further machining impossible. In order to achieve good hole quality, it is accordingly necessary to provide effective cooling of the tool/hole edge, and for the material removed by cutting (chips, splinters and grinding dust) to be removed continuously from the hole.
3. High wear resistance of fibers. The cutting machining of the fiber composites causes severe wear of the tool because of the good wear characteristics of the fiber materials. This leads to high wear costs, especially when producing holes with a requirement for high precision.

The methods used to produce holes in composite laminates are traditional drilling, boring, milling, sawing and grinding. The problem associated with these hole-forming methods as they are applied at the present time is that they are not sufficiently effective for various reasons from a technical/economic point of view.

High wear costs are a general problem associated with cutting machining where high precision is required. Great care must be taken when drilling or boring to ensure that delamination damage is avoided on both the entry and exit sides. Special cutters are required in order to achieve the stipulated hole quality, and special procedures must be formulated. In order to avoid extensive delamination damage on the exit side of the laminate, local lateral pressure must be applied around the edge of the hole. Another previously disclosed method of protecting the exit side from damage is to provide the laminate with an additional protective layer.

Sawing is a distinctly unsuitable method for producing holes with high precision requirements. When producing holes by grinding, use is made of a cylindrically shaped tubular body, the machining end of which is coated with a wear-resistant surface layer. Holes are produced by grinding the surface of the material transversely while first causing the grinding body to rotate. The method is slow and gives low precision.

Also disclosed through Swedish Patent Application 9201420-8 is a method for forming damage-free holes in fiber-reinforced material by reaming out a pre-formed hole, in conjunction with which the axis of rotation of a grinding body is oriented orthogonally to the longitudinal direction of the fibers at the edge of the hole. The proposed method also differs from previously disclosed surface-modifying hole machining methods in that the volume of material removed by cutting is considerably greater. In the case of hole forming by the radial removal of material, the volume of material removed by cutting is proportional to the change in radius before and after machining. In the case of traditional, surface-modifying machining, the profile depth of the edge of the hole provides a characteristic measure of this change in radius. When machining by the proposed method, the radial extent of any damage defines a lower limit for the difference in radius before and after machining. This lower limit is generally considerably greater than the profile depth of the edge of the hole. It will be appreciated from the foregoing that the size of the pre-formed hole differs significantly compared with the pre-formed hole. A production economic weakness associated with this method is the fact that the presence of a pre-formed hole is required.

It should be pointed out in this respect that hole-machining methods, in which a body driven rotatably about an axis of rotation is also caused to execute an orbital motion (i.e., the axis of rotation is displaced in such a way that the side is able to move relative to the edge of the hole), are generally familiar. SE 173 899 discloses a machine tool having a tool carrier rotating eccentrically about a principal axis, in which the distance between the tool carrier and the principal axis is adjustable. Adjustment of the distance between the tool carrier and the principal axis utilizes a guide component, which rotates about the principal axis together with the tool carrier. The guide component rotating together with the tool carrier is arranged perpendicular to the principal axis and is executed as a cam capable of rotating about it in relation to the tool holder, with the guiding profile of which cam the tool holder is in direct engagement. The advantages of this invention include, among other things, the absence of free play and the space-saving execution of the guide component. SE 382 506 discloses a rotatably driven, combined cutting tool for making holes in stationary workpieces, which holes can be provided with a conical starting chamfer.

Disclosed in the U.S. Pat. No. 5,641,252 (Eriksson et al.), is a method for machining holes in a fiber-reinforced composite material which presents a significant step forward in the art. The central axis of the hole passes through a predetermined point on the surface of the workpiece and is oriented in a certain direction in relation to the longitudinal directions of the fibers in the immediate vicinity of the point. The material is machined simultaneously in both an axial and a radial sense by causing the tool to describe axial motion and rotate not only about its own axis, but also eccentrically about the central axis. This method makes it possible to machine holes without causing delamination in the composite material.

Swedish patent document no. 400 916 discloses a tool for the machining of holes in steel. The cutting tool has a conical cutting head with a sharp point at the distal end. The machining surface of the tool forms an approximately 30 degree angle with the longitudinal axis of the tool and an approximately 60 degree angle with the bottom of the hole being produced. Such a cutting head tends to produce holes with larger diameters at the tops of the holes than at the bottom.

Aerospace and related structures are typically made up of different materials stacked together. Particular problems occur when co-drilling structures including several layers of different materials (material stacks). Such problems include burrs in between the layers, close up holes, and damage in filler material in between layers (liquid shims). Drilling holes using traditional techniques generates heat which may cause rapid wear of the tool. This problem is particularly pronounced when drilling holes in titanium.

Further examples of the prior art are provided by U.S. Pat. Nos. 4,190,386; 4,338,050; 5,685,674 and 4,757,645, which describe methods of producing holes in composite materials, and by GBA-2 048 135, which discloses a method of machining a pre-formed hole to the desired size/geometry.

What is needed in the art is a method and tool for producing holes without strength reducing damage incurred in the material during production.

SUMMARY OF THE INVENTION

The present invention provides a method and cutting tool for producing a hole or a recess in a workpiece which includes flat or curved sheets of fiber-reinforced composite material, metal or combinations thereof.

The invention comprises, in one form thereof, a shaft with a longitudinal axis and an axial cutting surface and at least one cutting edge disposed on the axial cutting surface and extending radially from the longitudinal axis with a gap between the radial inner extent of the cutting edge and the longitudinal axis.

An advantage of the present invention is reduction of the pressure in the center of the hole while machining.

Another advantage is the production of holes without strength reducing damage.

Yet another advantage is the production of holes free from damage without first having to pre-form a hole.

Yet another advantage is the production of holes to tight tolerances.

Yet another advantage is reducing the risk of the tool becoming blocked since the diameter of the tool is substantially smaller than the diameter of the hole.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
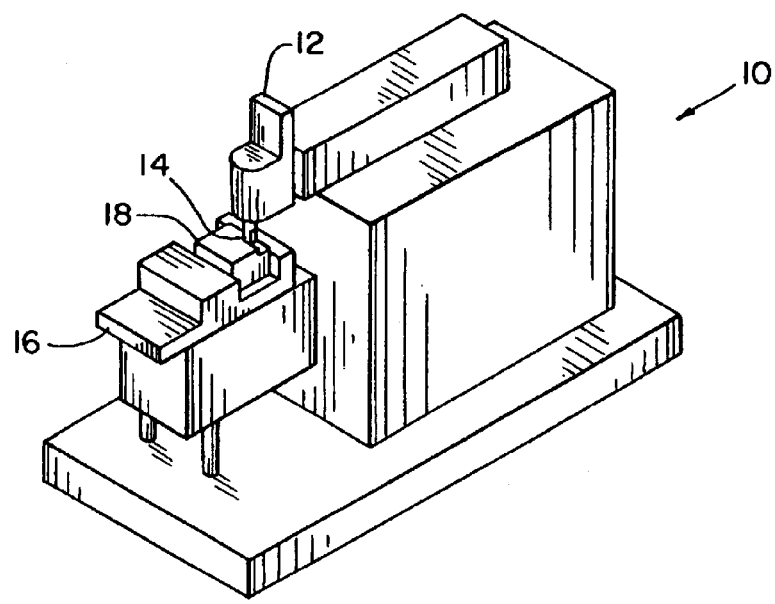
FIG. 1 is schematic perspective view of a machine with an embodiment of a cutting tool of the present invention.

Referring now to the drawings, and more particularly to FIG. 1, there is shown machine 10 which generally includes drive 12, holding element 16, and cutting tool 14. Cutting tool 14 is actuated rotationally and translationally by drive 12. Holding element 16 firmly holds workpiece 18 allowing cutting tool 14, when actuated, to remove material from workpiece 18. Cutting tool 14 may have a wear-resistant surface to promote long tool life.

Figure 2:
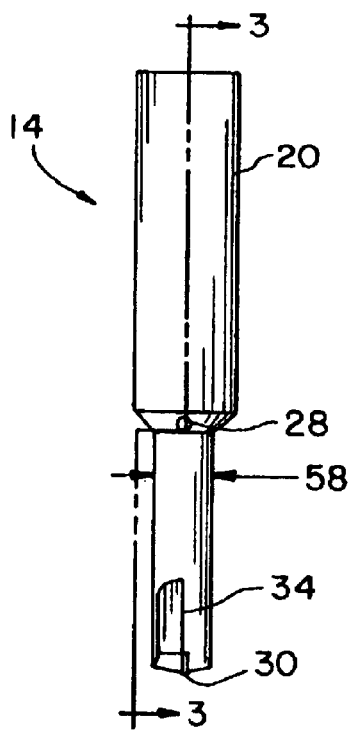
FIG. 2 is a front view of the cutting tool of the present invention shown in FIG. 1.
Figure 3:
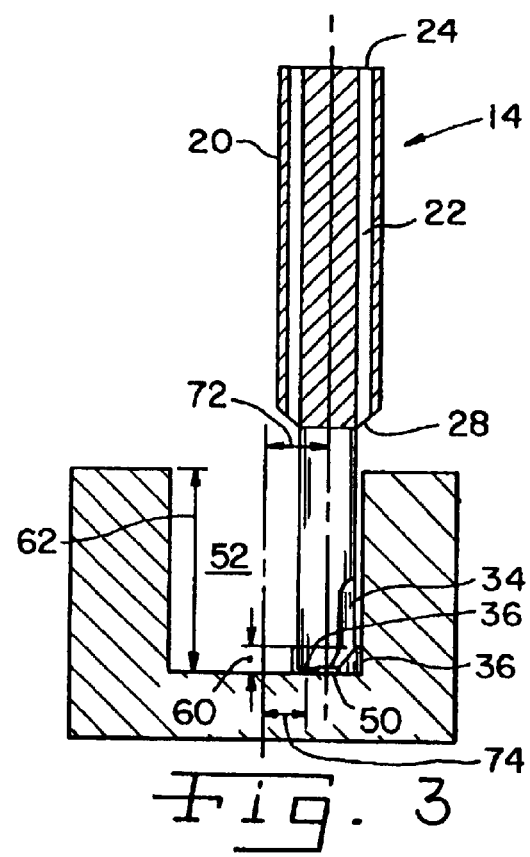
FIG. 3 is a partially sectional view taken along section line 3—3 in FIG. 2.

Cutting tool 14 (FIGS. 2 and 3) includes shaft 20 which is held by drive 12 during a cutting operation. Enclosed within shaft 20 and on the outside of cutting diameter 32 is cooling fluid channel 22 with channel inlet 24 and channel outlet 28. Cooling fluid channel 22 is shown as a linear channel with an axis parallel to the longitudinal axis of cutting tool 14. Alternatively, cooling fluid channel 22 can spiral around the longitudinal axis of cutting tool 14. Channel inlet 24 allows for the ingress of cooling fluid into channel 22 and channel outlet 28 allows for the egress of cooling fluid from channel 22 onto workpiece 18.

Flute 34 allows material to exit the working area and cooling fluid to reach cutting edges 36. Cutting edges 36 execute the removal of material from workpiece 18.

Figure 4:
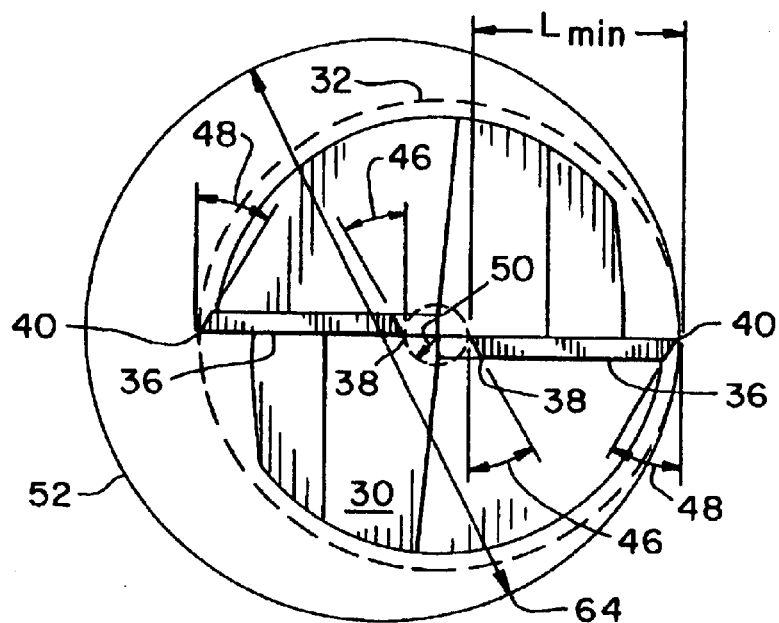
FIG. 4 is an end view of the cutting tool superimposed on and producing a larger hole in accordance with an embodiment of a method of the present invention.

Axial cutting surface includes at least one cutting edge 36 with radial inner extent 38 and radial outer extent 40 (FIG. 4). Located on radial inner extent 38 is cutting angle 46. Radial outer extent 40 has cutting angle 48. Cutting angles 46 and 48 may have the same or different angular sizes. Cutting diameter 32 may be greater than shaft diameter 58. Radial inner extent 38 ends at a point distal from the longitudinal axis (FIG. 3, not numbered) of cutting tool 14. The distance between radial inner extent 38 and the longitudinal axis of cutting tool 14 is represented by the radius of circular gap 50.

A method for producing a hole in a workpiece is shown in FIG. 4, wherein the end view of cutting tool 14 is superimposed on hole 52. The longitudinal axis (FIG. 3, not numbered) of hole 52 passes through a predetermined point on the surface of workpiece 18. The material is machined simultaneously in both an axial and a radial or translational sense by causing cutting tool 14 to describe an axial motion and to rotate not only about its own longitudinal axis, but also eccentrically about the longitudinal axis of hole 52.

Figure 5:
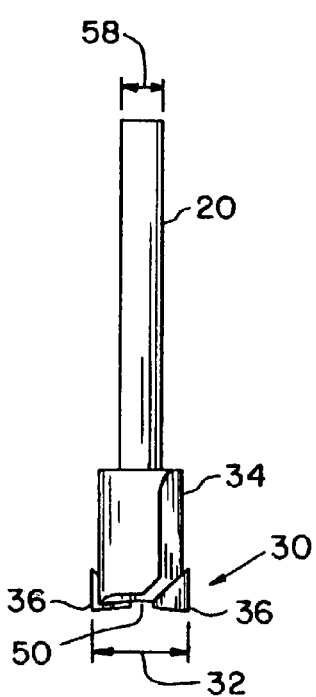
FIG. 5 is a front view of another embodiment of the present invention with a larger diameter cutting surface than shaft diameter.
Figure 6:
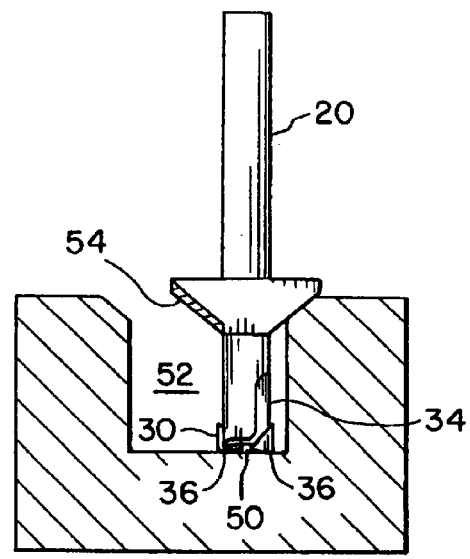
FIG. 6 is a partially sectional front view of another embodiment of the cutting tool of the present invention with an integrated countersink.

In another embodiment (FIG. 5) cutting surface 30 has a cutting diameter 32 greater than the attached shaft 20 shaft diameter 58. In a further embodiment (FIG. 3), cutting surface 30 and cutting edge 36 have a cutting surface height 60 less than hole depth 62. In yet another embodiment (FIG. 6), a countersink 54 is coupled with and positioned concentrically about shaft 20.

When cutting diameter 32 is greater than one half of hole diameter 64, the minimum length $L_{MIN}$ for cutting edge 36 is given by:

$$L_{MIN}=(TOOL_{DIA}/2)-e; \text{ where}$$

$$e=(HOLE_{DIA}-TOOL_{DIA})/2;$$

$TOOL_{DIA}$=the diameter of axial cutting surface 30; and $HOLE_{DIA}$=the finished diameter of hole 52.

This ensures that the center portion of hole diameter 64 is removed by cutting action of cutting edge 36.

Figure 7:
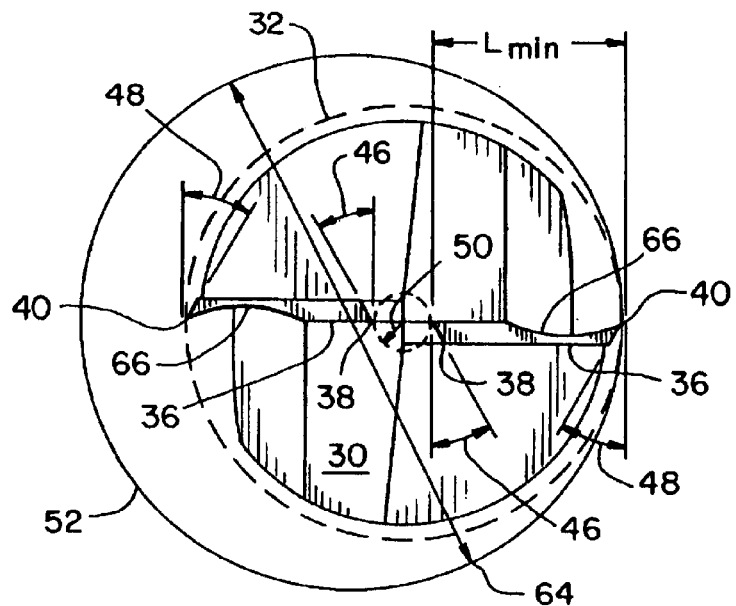
FIG. 7 is an end view of another embodiment of the cutting tool showing a cutting edge with a curved surface and superimposed on and producing a larger hole in accordance with an embodiment of a method of the present invention.
Figure 8:
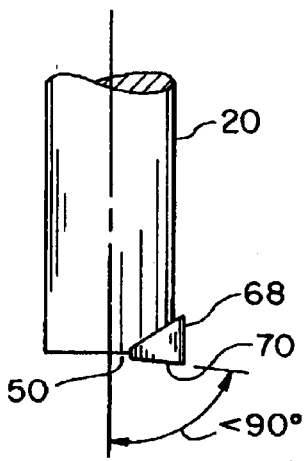
FIG. 8 is a cutaway view of an embodiment of the cutting tool of the present invention showing a cutting edge radial surface at less than 90° to the cutting tool longitudinal axis.
Figure 9:
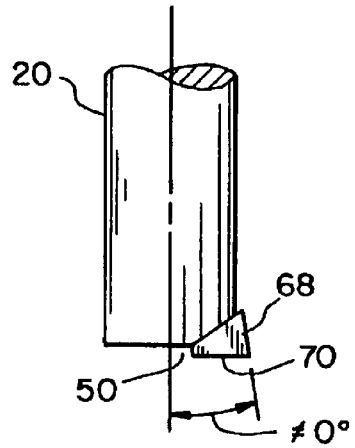
FIG. 9 is a cutaway view of an embodiment of the cutting tool of the present invention showing a cutting edge lengthwise surface not parallel to the cutting tool longitudinal axis.
Figure 10:
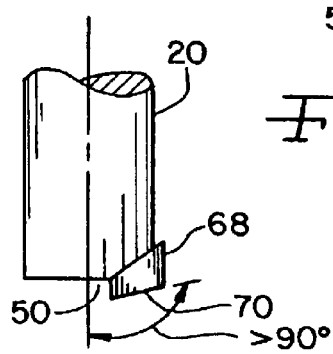
FIG. 10 is a cutaway view of an embodiment of the cutting tool of the present invention showing a cutting edge radial surface at greater than 90° to the cutting tool longitudinal axis.
Figure 11:
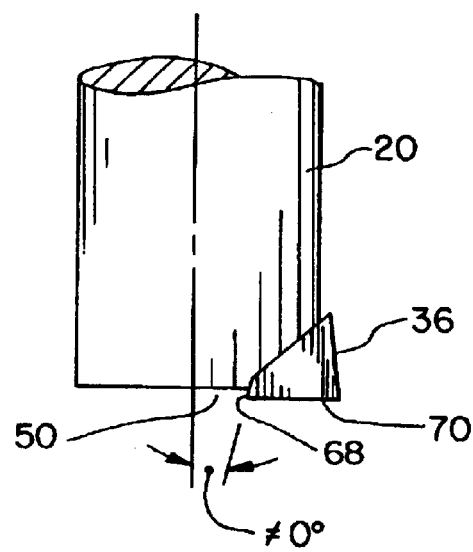
FIG. 11 is a cutaway view of an embodiment of the cutting tool of the present invention showing another cutting edge lengthwise surface not parallel to the cutting tool longitudinal axis.
Figure 12:
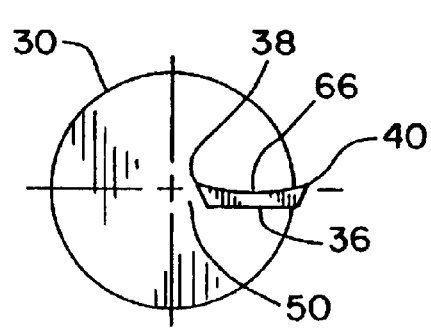
FIG. 12 is an end view of an embodiment of the cutting tool of the present invention showing a cutting edge curved surface extending to the inner radial extent of the cutting edge.
Figure 13:
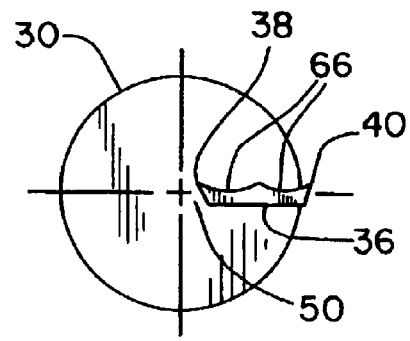
FIG. 13 is an end view of an embodiment of the cutting tool of the present invention showing two cutting edge curved surfaces.

In other embodiments cutting edge 36 may have at least one curved surface 66 (FIGS. 7 and 13) and curved surface 66 may extend to radial inner extent 38 (FIG. 12). In other embodiments (FIGS. 9 and 11) cutting edge 36 may have at least one lengthwise surface 68 which is not exactly parallel to cutting tool 14 longitudinal axis and/or at least one radial surface 70 (FIGS. 8 and 10) which is not exactly perpendicular to cutting tool 14 longitudinal axis. Cutting diameter 32 may be greater than cutting surface height 60.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of producing a hole in a workpiece of fiber-reinforced composite material, wherein the hole has a longitudinal axis which passes through a predetermined point on the surface of the workpiece and is oriented in a determined direction relative the workpiece, said method comprising the steps of:

providing a cutting tool having a longitudinal axis and a cutting diameter which is smaller than the diameter of the hole that is produced, said cutting tool including a shaft with a longitudinal axis and an axial cutting surface, at least one cutting edge disposed on said axial cutting surface and extending radially with respect to said longitudinal axis of the cutting tool, said axial cutting surface having at least one axially extending cutting edge having a cutting surface height less than the depth of the finished hole, a radial inner extent of said at least one cutting edge and said longitudinal tool axis defining a gap therebetween;

positioning said cutting tool eccentrically relative to the longitudinal axis of the hole; and simultaneously machining the workpiece in both an axial and a radial direction relative to the longitudinal axis of the hole, by simultaneously rotating said cutting tool around said longitudinal axis of said cutting tool, moving said cutting tool in an axial direction, and moving said cutting tool eccentrically around the longitudinal axis of the hole.

2. The method of claim 1, wherein the eccentric movement of said cutting tool comprises strictly rotary motion in which a substantially constant distance is maintained between the longitudinal axis of the hole and said longitudinal axis of said cutting tool.

3. The method of claim 1, wherein the eccentric movement of said cutting tool comprises stepwise linear movements in which varying distances occur between the longitudinal axis of the hole and said longitudinal axis of said cutting tool.

4. The method of claim 1, wherein said cutting tool comprises a grinding tool.

5. The method of claim 1, wherein said cutting tool comprises a milling tool.

6. The method of claim 1, wherein said cutting tool comprises a boring tool.

7. The method of claim 1, wherein said cutting tool includes a cooling fluid channel.

8. The method of claim 7, comprising the further step of supplying coolant fluid through said cooling fluid channel during said machining step.

9. The method of claim 1, wherein said axial cutting surface has a cutting diameter greater than a diameter of said shaft.

10. The cutting tool of claim 1, wherein said axial cutting surface has a cutting surface height less than a cutting diameter.

* * * * *

UNITED STATES PATENT AND TRADEMARK OFFICE
CERTIFICATE OF CORRECTION

PATENT NO. : 6,773,211 B2
DATED : August 10, 2004
INVENTOR(S) : Zackrisson et al.

It is certified that error appears in the above-identified patent and that said Letters Patent is hereby corrected as shown below:

Title page,
Item [75], Inventors, after "Mathias Wolf", please delete "Båsta" and substitute therefore -- Bålsta --.

Signed and Sealed this

Twenty-second Day of March, 2005

JON W. DUDAS
*Director of the United States Patent and Trademark Office*